United States Patent [19]

King

[11] 3,824,442

[45] July 16, 1974

[54] INVERTER CIRCUITS

[75] Inventor: Kenneth Gordon King, London, England

[73] Assignee: Westinghouse Brake and Signal Company Limited, London, England

[22] Filed: Aug. 23, 1972

[21] Appl. No.: 282,938

Related U.S. Application Data

[63] Continuation of Ser. No. 268,460, July 3, 1972.

[30] Foreign Application Priority Data
July 23, 1971  Great Britain.................... 34783/71

[52] U.S. Cl..................................... 321/5, 321/11
[51] Int. Cl. ........................................... H02m 7/00
[58] Field of Search ........................................ 321/5

[56] References Cited
UNITED STATES PATENTS
3,119,057  1/1964  Wilson ........................ 321/45 R X
3,346,794  10/1967  Stemmler ........................... 321/5 X
3,360,709  12/1967  Etter ......................................... 321/5
3,539,902  11/1970  Hickling ............................ 321/43 X
3,603,867  9/1971  Cuenoud ............................. 321/5 X
3,611,108  10/1971  Susumu .................................. 321/5

Primary Examiner—William M. Shoop, Jr.
Attorney, Agent, or Firm—Larson, Taylor & Hinds

[57] ABSTRACT

A polyphase, floating neutral, inverter in which harmonics of the operating frequency are added to the fundamental to increase the line-to-line output voltage for a given input voltage. In the three-phase three-wire case the Triplen harmonics are used. The inverter uses single phase amplifiers and a polyphase drive signal generator. One generator is described in detail. The inverter also includes a rapid acting semiconductor device protection circuit which employs an electrical network analog of the thermal characteristics of the device.

4 Claims, 22 Drawing Figures

(a) RECTIFIER CURRENT, IN PHASE (b) SINUSOIDAL CURRENT, OUT OF PHASE 3,824,442

INVERTER CIRCUITS

CROSS REFERENCE TO RELATED APPLICATION

This application is a continuation of U.S. application Ser. No. 268,460, filed July 3, 1972.

This invention relates to inverters and in particular to an inverter arrangement having a three-wire three-phase alternating current output.

According to the invention there is provided an inverter arrangement including input terminals for the connection of a d.c. source, output terminals for the supply of an $n$-phase, $n$-wire alternating output, a drive signal generator to provide a drive signal including components at the fundamental frequency of said alternating output and odd harmonics thereof whereby each phase output waveform includes harmonic components which in conjunction with the harmonic components of other phase voltages result in a sinusoidal line-to-line waveform of higher value than that formed by the fundamental of each phase voltage.

In an arrangement for a three-phase, three-wire output the odd harmonics may be Triplen harmonics.

The means responsive to the drive signal may be a class B amplifier for each phase of the output. The means responsive to the drive signal may be an electrical power conversion circuit responsive to a control signal having an alternating waveform to produce an output of alternating potential, including means to respond to a zero of the control waveform to interrupt a supply path between the source and one output terminal for an interval when said zero does not coincide with a current zero in said supply path, and means to complete an alternative current path across the output terminals of the circuit for a period between the control signal zero and the current zero, as is described hereinbelow.

An output transformer may be provided for each means responsive to drive signal to isolate the output terminals from said means and to ensure there is no direct current path from any input terminal to any output terminal. The output terminals may be connected to a delta-star transformer so that the star-point of the transformer secondary provides the neutral terminal for a three-phase four-wire a.c. output.

According to the invention there is also provided a semiconductor device protection circuit including means responsive to the instantaneous values of current in and voltage across such a device installed in an inverter to produce a signal representing the instantaneous power dissipation in the device when operated in the linear mode, an electrical network simulating the thermal characteristics of the device and means responsive to the output of said network when supplied with said signal to indicate whether or not an allowable thermal operating condition is exceeded.

The signal representing the instantaneous power may be an approximation derived from the sum of signals proportional to the instantaneous voltage and instantaneous current at the device. The electrical network may be a combination of electrical wave shaping circuit elements simulating the variation of the relative thermal impedance of the device with the variation of the pulse form of a signal applied to the device.

According to the invention there is provided a drive signal generator to produce a drive signal including a component at a fundamental frequency and at the Triplen harmonics thereof for each phase of a three-phase alternating current including, in an oscillatory loop, an integrater for each phase to generate a three-phase four-wire output at the fundamental of the alternating current, means to combine a portion of the peak of each phase waveform as a Triplen harmonic signal to displace the neutral point of said three phase signal.

The means to combine said peak waveforms may include unidirectional paths to supply the peak of each phase waveform in turn to a voltage sensitive network which permits only the waveform above a certain selected value to pass to a common load resistor the remote end of which is connected to a reference voltage, whereby a neutral connection to the adjacent end of said load resistor is so displaced. The voltage sensitive network may include a Zener diode to set the selected voltage value. The voltage sensitive network may be a limiter including means to adjust a symmetry of the limiter with respect to the reference voltage.

Embodiments of the invention will now be described with reference to the accompanying drawings in which:

FIG. 1 shows a block schematic circuit diagram of an inverter arrangement,

FIGS. 2 and 3 show waveforms useful in understanding the operation of the inverter arrangement in FIG. 1, FIGS. 4 and 5 show waveforms useful in understanding the operation of the invention when embodied in an inverter, FIG. 6 shows graphs of power dissipation in a device, FIG. 7 shows a block schematic circuit diagram, FIG. 8 shows a graph of the transient thermal impedance of a device, FIG. 9 shows an analog network, FIG. 10 shows a modification of the circuit illustrated in FIG. 7, FIG. 11 shows an arrangement in which, by means of transformer coupling, all protection circuits are operated at the same potential and only one level detector is required, FIG. 12 shows a block shematic diagram of a drive signal generator, FIG. 13 shows a waveform useful in understanding the operation of a further embodiment of the invention, FIG. 14 shows a skeleton circuit of an inverter, FIG. 15 shows a circuit diagram of an inverter embodying the modification illustrated in FIG. 13, FIG. 16 shows another circuit embodying the modification illustrated in FIG. 13, FIG. 17 is a circuit diagram of a practical inverter circuit in which the present invention can be incorporated, FIG. 18 is a circuit diagram of a further embodiment similar to that of FIG. 17, FIG. 19 is a circuit diagram of the basic components of the circuit of FIG. 17, FIG. 20 illustrates the current paths for various operating conditions of the circuit of FIG. 19, FIG. 21 is a circuit diagram of a practical inverter circuit in which the present invention is incorporated, and FIG. 22 is a circuit diagram of a further inverter circuit incorporating the present invention.

FIG. 1 shows three single-phase inverters 1, 2 and 3, having respective input terminals 4, 5 and 6 for the connection of individual d.c. sources. A source of drive signals for each inverter is shown at 10. The exact form of these drive signals is described below but briefly they are arranged to drive the three single-phase inverters in a three-phase relationship so that when one output terminal on each inverter is connected to a common point 11 the other output terminals 7, 8 and 9 will provide a three-phase three-wire a.c. supply. It is essential in this arrangement that no direct current path exists between any of the output terminals 7, 8 and 9, or terminal 11, and any of the input terminals 4, 5 and 6. To achieve this either the d.c. sources are separate from each other or each inverter includes an isolating output transformer.

The drive signal generator 10 is arranged to produce for each phase a component at the fundamental frequency of the alternating current output required, the components being at the correct relative phase angle. In addition the generator provides the Triplen harmonic series ($3^x$ harmonics where $x$ is a positive integer), or a part thereof, for each fundamental component. The output of each single-phase inverter will reproduce the complex drive signal, within the limits of the accuracy of the amplifier, using power derived from the d.c. source for that inverter. The peak-to-peak voltage of the output waveform of each inverter is theoretically twice that of the d.c. supply. If the common point 11 was to be connected to a fixed potential, say earth, the waveform on each of the output terminals 7, 8 and 9 would be that of the drive signal with this peak-to-peak value, with respect to the fixed potential. If however the terminal 11 is allowed to float then the Triplen harmonic component in each phase will displace the output waveforms with respect to each other while maintaining their individual peak-to-peak voltages so that the phase voltages at terminals 7, 8 and 9 are increased. The current drawn from a respective source by each inverter for a given phase current will be the same whether or not terminal 11 is connected to the fixed potential so that when terminal 11 is floating the efficiency of power is increased. This increase in efficienty is achieved by improving the form factor of the output waveform of each inverter so that power which would other-wise have been wasted in internal voltage drops when a sinusoidal drive waveform is applied is now usefully employed and supplied to a connected load.

FIG. 2 shows the output voltage waveforms at a phase terminal for a given phase voltage and line current when the common terminal, 11, is fixed or floating. waveform 21 is for a fixed common terminal and a phase voltage V. The shaded area 23 represents the voltage drop in a push-pull class B amplifier during a quarter-cycle. Waveform 22 shows the output voltage for an arrangement embodying the invention and producing the same output power as in the previous case. However the voltage drop shown by the shaded area 24 is clearly less and accordingly the supply voltage can be reduced while still achieving the same line current. The supply voltage can be reduced to $(3)^{1/2}V/2$ of the previous value, for the same effective line-to-line voltage. The reason for this is shown in FIG. 3. Curve 31 is the line-to-line potential at two of the output terminals 7, 8 and 9. When the inverter is driven by a sinusoidal waveform the peak values of each wave do not occur at the same time. Therefore the line-to-line potential must always be less than twice the maximum excursion during one half-cycle of the waveform at any terminal. This is shown by the two waves 32 and 33. However when driven with the waveform containing Triplen harmonics the output waveforms, 34, 35, at the two output terminals will produce the same line-to-line waveform 31 although the peak value of each waveform is less than that for the half-sine wave 32 or 33. On examining waveforms 34 and 35 it will be seen that their peak values just coincide to produce the peak value of the line-to-line waveform 31. The sinusoidal wave shape is maintained on either side of the peak by the Triplen components present in the drive waveform. These components do not appear in the line-to-line waveform as the three-wire arrangement has a floating neutral and this results in cancellation of the Triplen harmonics which would otherwise be present in the line-to-line waveform. It will be seen that it is thus possible to produce the same output voltage as in the sinusoidal drive case with a reduced d.c. supply voltage to each inverter, which is in itself advantageous, and in addition the energy losses in the inverters are reduced thus reducing the quantity of heat that has to be dissipated from each inverter. The output power will remain the same as the same line current is drawn in each case. The peak value of waveforms 31 in FIG. 3 is $(3)^{1/2}V$ where V is the peak value of a half-sine wave such as 32. As waveforms 34 and 35 contribute equally to the peak value of waveform 31 the peak value of each of these waveforms is $(3)^{1/2}V/2$. The maximum efficiency of a class B inverter for a resistive load is 78.5% on sine-wave drive. As the output power is constant the efficiency with Triplen drive is increased in the inverse ratio of the reduction of the input voltage compared with sine-wave drive. Thus the efficiency is now $78.5 \times 2/(3)^{1/2} = 90.7\%$ as a theoretical maximum again for a resistive load. The practical efficiency will of course be lower as allowance must be made for the spread of component parameters and voltage variation. However with a reasonable allowance for these the actual efficiency will be at least equal to the maximum theoretical efficiency of a class B inverter with sine-wave drive.

In a preferred application of the invention the load connected to the output terminals is a full wave rectifier with inductive smoothing and connected so that current is drawn for 120° of each half-cycle. FIG. 4 shows the line current and a phase waveform for one half-cycle at one output terminal. As line current is only drawn for 120° of the 180° of a half-cycle in a quasi-square waveform energy lost due to the wave shape only occurs in the inverters for 30° periods on either side of the 60° flat top of the waveform. The losses are thus reduced even further in comparison to the sine wave drive case and the theoretical maximum efficiency is increased to 95.5%. This value of efficiency will of course be reduced if a capacitor-input filter is used in the rectifier. A reduction will also occur if a commutating inductance is used in the inverter as this will make the current in the line trapesoidal, increasing the losses for a short period after $\pi/6$ and extending the waveform beyond $5\pi/6$ with further losses here. In a practical case the efficiency should be at least as high as with a resistive load, that is approximately 78%. This should be compared with the practical case of 67% efficiency for a conventional sine wave drive.

It will be seen from the above discussion that the efficiency of the inverter is dependent on the nature of the load it is supplying. If an inverter is designed to operate with a particular type of load then it will only be provided with the appropriate heat dissipation capacity for that load. If the nature of the load is varied or if the operating conditions are otherwise changed to increase the dissipation in the inverter than damage will almost certainly occur.

Protection devices operating in response to the current drawn by the inverter from its supply will not provide protection against this sort of overload as the supply current cannot usually indicate what proportion of the energy supplied is being dissipated in the inverter and what proportion is being applied to the load. Thus in the case described above of a three-phase rectifier with inductive smoothing a short circuit on one phase can cause a displacement of the current waveform with respect to the voltage waveform and the periods of high current flow in the active devices in the inverter will no longer coincide with periods of low voltage drop. Thus the dissipation in a device will be substantially increased even though the current drawn from the source may not change. FIG. 5 shows the effect of this phase displacement.

The dissipation in such a device has two critical parameters. Firstly the averge dissipation over a long period of time and secondly the instantaneous dissipation. The instantaneous dissipation is particularly critical if it results in the supply of heat to a part of the device at a higher rate than the thermal conductivity of the device permits the transfer of this heat to a heat sink. Therefore simply measuring the temperature of the heat sink or the average temperature of the device will not give complete protection, while exploiting the full potential of the device.

A conventional way of specifying the safe power dissipation in a device is shown in FIG. 6. A family of curves is plotted for various pulse widths on voltage and current axes extending between the maximum current and voltage ratings shown by the paraxial lines. FIG. 6 also shows one such curve plotted on logarithmic axes to produce a straight line characteristic. The curves in FIG. 6 are based on a parameter of the device called the transient thermal impedance. This is a quantity whose value is dependent on the duration of the pulse applied as well as the power. The instantaneous dissipation must be controlled to avoid "hot-spots" in which heat accumulates more quickly than the thermal conductivity of the device can dissipate it. FIG. 3 shows a graph of this quantity, plotted against pulse duration on a relative basis, for the device identified by the number 2N3773, a transistor.

This characteristic can be represented by an electrical analog network and if signals representing current and voltage in magnitude and duration are applied to the network an output representing the dissipation level in the device will be obtained. FIG. 7 shows an outline of a circuit to do this. Signals representing the instantaneous values of current in and voltage across a device operated in the linear mode, in this case a transistor, are combined in a multiplier 72 to produce a signal representing the instantaneous power in the device and this signal is applied to the analog network 73 which is the electrical model of the thermal characteristics of the device. The output of the analog network is a signal representing the dissipation in the device and this is applied to a level detector 74 which will generate a trip signal or other suitable warning when the dissipation signal from the analog network is excessive.

However the anlog network required to model fully the thermal characteristic shown for a device such as a transistor or a thyristor will be extremely complex. If this device is used in say an inverter working at say 400 Hz it is likely to be exposed only to significant pulses having a duration between 0.2ms and 2.0ms. Over this range it is possible to produce an electrical network having a response approximately equivalent to the relative thermal impedance characteristic using the circuit elements of a step and one time-constant. Curve 81 in FIG. 8 shows the electrical characteristic of such a circuit which circuit is itself shown in FIG. 9. If a closer match to the thermal impedance characteristic is required a further time-constant element may be added at the short-time end of the range. However the error in the characteristic shown errs on a side of safety.

The power dissipation in a device usually needs further restriction at the extremes of current and voltage and this is shown by the dotted paraxial lines in FIG. 6. Between these limits a straight line is a close approximation to the rectangular hyperbola representing constant power and furthermore the approximation is on the safe side. Thus instead of having to express power as a product of voltage and current it can be expressed as the sum of voltage and current and a sufficiently good approximation to the instantaneous power dissipation can be obtained by adding signals proportional to the voltage and current. FIG. 10 shows a circuit of the type shown in FIG. 7 simplified by making the approximations described above. A separate circuit would have to be used for the transistors connected to the positive and negative supplies but in, for example, a multi-phase inverter all the transistors on one supply line could be connected to a common level detector. FIG. 11 shows an arrangement in which, by menas of transformer coupling, all protection circuits are operated at the same potential and only one level detector is required. individual adding circuits are of course still required as the instantaneous companents for each device must be considered separately.

The application of the output of the level detector to protect the circuit will be readily apparent to those skilled in the art. If required the threshold level of the level detector may be linked with ambient temperature or the temperature of the heat sinks of the devices. In this way full advantage can be taken of any increase in dissipation capability at low temperatures.

FIG. 12 shows a block schematic diagram of a drive signal generator suitable for use as described above. The generator includes three integrating stages, one for each phase, each including an operational amplifier. A suitable operational amplifier has been found to be that available from Fairchild Inc. under the reference A709C. An oscillatory loop is formed from the three integrating stages, 121, 122 and 123, in series. The output of each stage forms one of the three phases of the fundamental component of the alternating current drive signal. The loop is provided with amplitude limiting and loop gain controls 124 and 125 respectively and these controls, together with the balance controls provided by the adjustable tapping points on resistors 135, 136 and 137 for the phase outputs, permit the adjustment of the loop to produce the three-phase sinusoidal output waveforms required. The sinusoidal output waveforms are then applied to a waveshaping circuit in which the Triplen harmonic components are generated. This circuit includes for each phase a pair of oppositely poled diodes (126 to 131) the diodes of each polarity being connected to a common point. Each common point is connected through an individual Zener diode, 132 or 133 and a common loat resistor 134 to the neutral point of the oscillator three-phase output. The Zener voltage of the Zener diodes 132 and 133 is so chosen that on the appropriate one of the diodes 126 to 131 conducting on the occurrence of a peak of one phase of the sinusoidal waveform the Zener diode conducts to clip the peak of this waveform and to generate with it a voltage across the common load resistor 134. By appropriate choice of the Zener voltage having regard to the peak value of the sinusoidal waveform a voltage across the common load resistor measured at the point N will be the required Triplen harmonic component. This Triplen component which displaces the neutral point will therefore also displace the respective phase voltage in the same manner and the clipped sinusoid will be augmented by the Triplen components to produce the required drive waveform. In one oscillator constructed in the manner described above the sinusoidal output waveform had a peak line voltage of 16 volts and each of the Zener diodes 132, 133 has a nominal voltage of 8.2 volts to produce the required Triplen harmonic component.

It is essential that the Zener diodes are accurately matched as on this matching depends the correct formation of the Triplen component. An alternative arrangement which avoids some of the problems of matching uses a pair of transistors opposite conductivity type, one in place of each Zener diode. The two bases of the pair of transistors are connected to a balance circuit which may be another transistor driven from a potential divider energised by an emitter follower, so that the Triplen harmonic components can be accurately balanced.

Other forms of drive signal generator in which a Triplen harmonic component can be produced would of course be equally suitable for use with the invention.

A modification of the inverter arrangement described above is illustrated by the waveform in FIG. 13 which should be compared with that in FIG. 2. The shaded loss area 24 in FIG. 2 can be reduced still further with respect to area 23 by providing at any instant a supply voltage for the inverters of FIG. 1 which is only sufficient for the value of the output voltage waveform 22 at this instant in time. A convenient practical arrangement which approximates to this is shown at the left of FIG. 13 where the shaded area 131 indicates the loss when the value of the supply voltage is stepped through two lower values $V_3$ and $V_2$ to $V_1$ during the interval of time when the value of $\omega t$ changes from 0 to $\theta_2$. The negative-going portion of the output voltage waveform would be treated in a similar manner by switching at $\theta_3$ and $\theta_4$ as $\omega t$ tends towards the value $\pi$.

Figure 1:
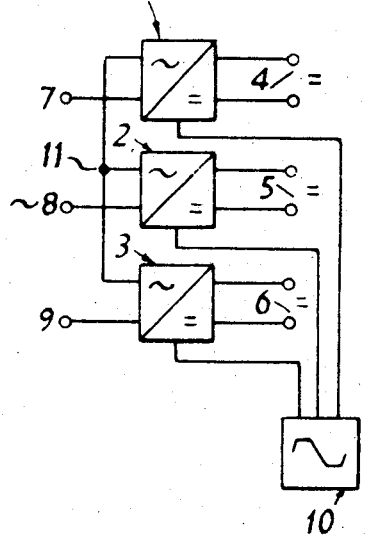
Figure 2:
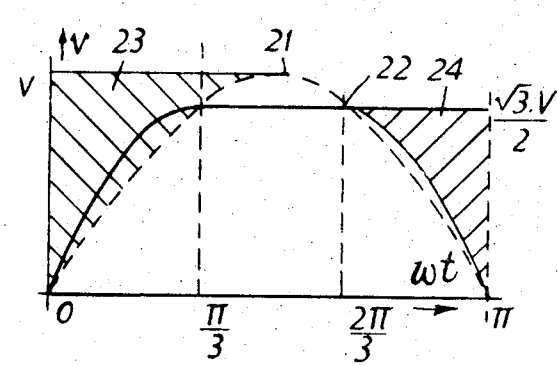
Figure 3:
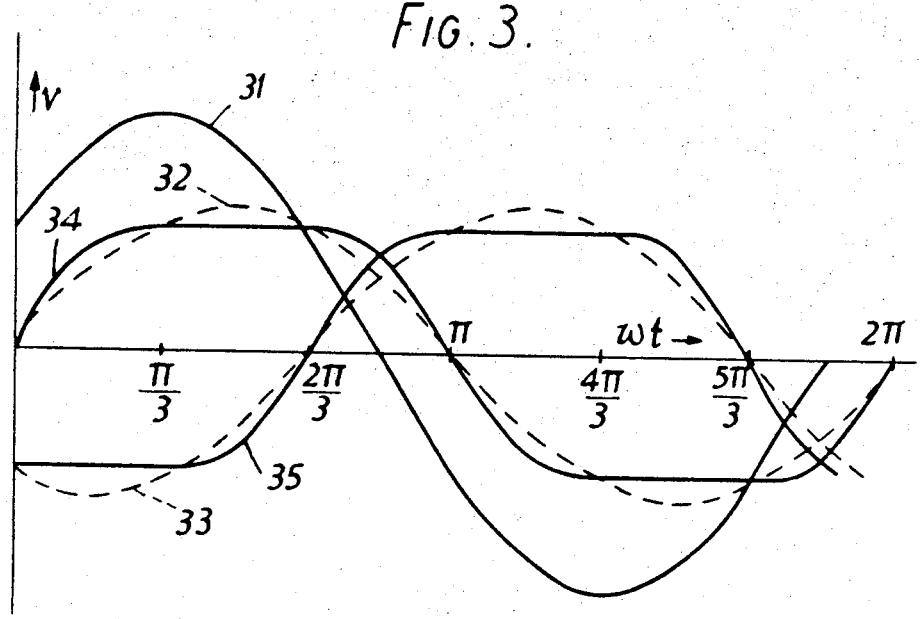
Figure 4:
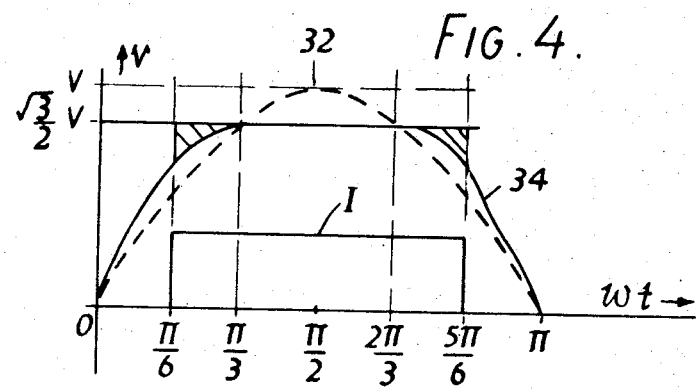
Figure 17:
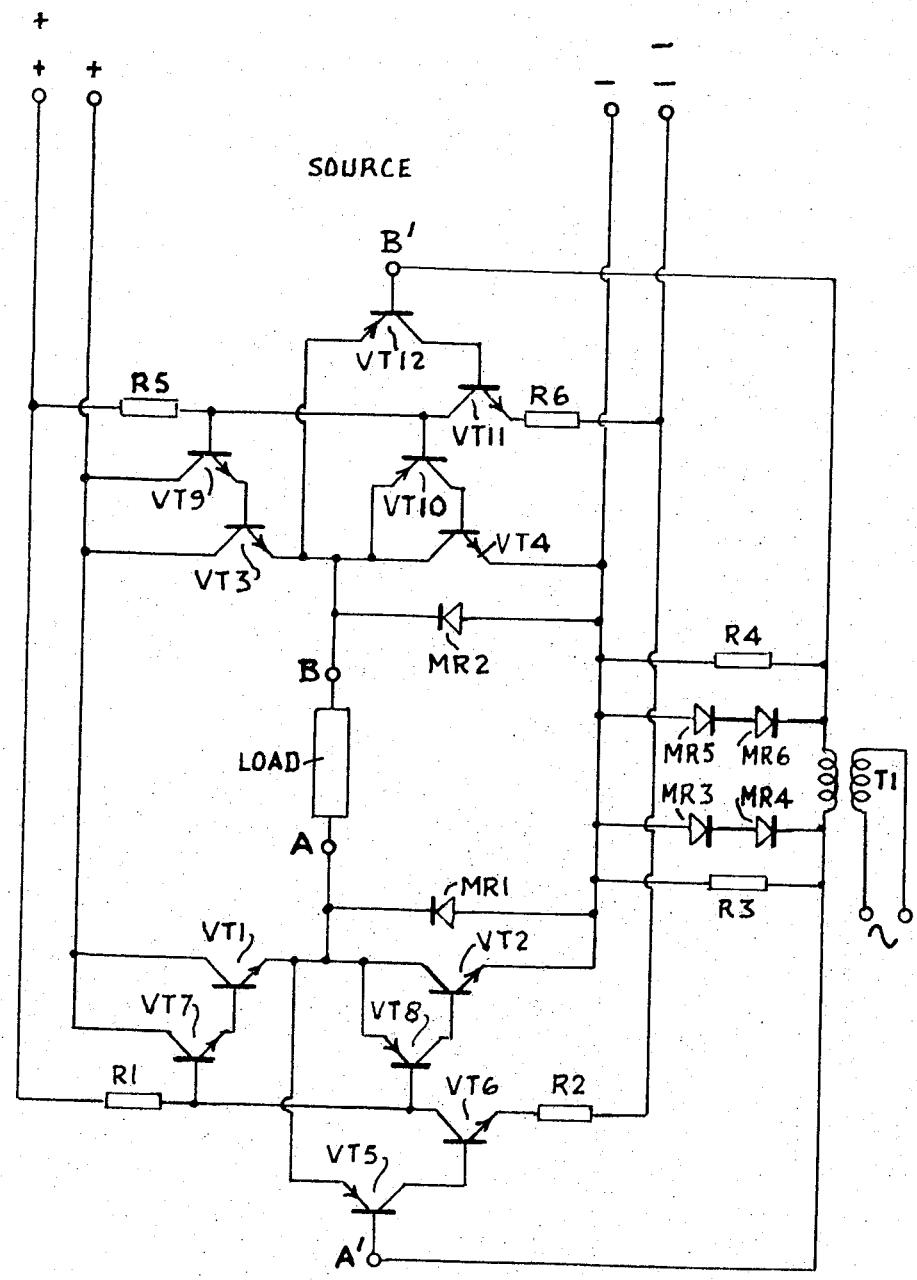

Reference is now made to FIG. 17 which shows a practical inverter arrangement which is disclosed in U.K. Patent application 12326/70 as well as in corresponding Australian Patent application 25711/71 and is included here as background information for the description of several of the figures described hereinbelow. In the circuit of FIG. 17, the four arms of the bridge are formed by pairs of transistors connected as compound emitter followers, the pairs being respectively VT1 and VT7, VT2 and VT8, VT3 and VT9, VT4 and VT10. Two adjacent pairs are grouped and each group is biassed and driven through two transistors and two resistors VT5, VT6, R1, R2 and VT11, VT12, R5, R6 respectively. Diodes MR1, MR2 are connected as collector-emitter shunts for transistors VT2 and VT4 respectively. Load connection terminals, A and B, are provided and connected to the collectors of VT2, VT4 respectively. The drive terminals A' and B' are the bases of transistors VT5 and VT12 respectively. A sinusoidal driving signal applied to the terminals of the primary of transformer T1 will pass from the secondary to the drive terminals A', B'. Diodes MR3–MR6 ensure that terminals A' and B' are respectively driven slightly negative with respect to the appropriate output terminal to ensure that VT1 and VT3 respectively are properly cut off as appropriate. The source for the output power is connected to terminals +,− while terminals ++, −− are connected to a supply of slightly higher voltage to ensure that adequate base current drive is available for each pair of transistors in the bridge arms. Each group of transistor pairs and its associated drive transistors operates in a similar manner to well-known audio amplifier circuits under the control of the drive voltage applied to transformer T1 to produce a sinusoidal output voltage at terminals A and B in accordance with the alternate sinusoidal half cycles applied to drive terminals A' and B'. These half cycles provide a slightly negative potential during their OFF times which is applied to the bases of VT5 and VT12 respectively to ensure complete cut off of VT1 and VT3. At each zero crossing of the drive voltage the respective one of transistors VT1 and VT3 is driven from the conducting to the non-conducting state but if the load is reactive then, as shown in FIG. 2, the appropriate diode MR1 or MR2 becomes conductive and together with the saturated one of the transistors VT2 and VT4 prevents the appropriate output terminal changing its voltage to permit the appropriate one of transistors VT1 or VT3 to be biassed into the conducting stage through the respective biassed transistor. Further as soon as the output current in the closed dissipation loop falls to zero the saturated transistor can be rendered non-conductive, the other saturable transistor rendered conductive and the respective one of transistors VT1 and VT3 also rendered conductive. The circuit arrangement just described will therefore produce sinusoidal output current and waveforms when supplied with the sinusoidal primary drive voltage as described above. There will be slight steps in the waveforms at $\phi°$ after each voltage zero as the voltage drops in parts of the circuit change with the redistribution of the supply from the source to the load. In this circuit transistors VT2 and VT4 are arranged to be saturated when the transistors VT1 and VT3 respectively control the shape of the half cycle waveform for each polarity. Some of the reactive energy in the load is of course dissipated in the dissipation loop during the interval of $\phi°$ after each voltage zero but this energy is only a small portion of the total and has little effect on the overall efficiency of the arrangement.

Figure 18:
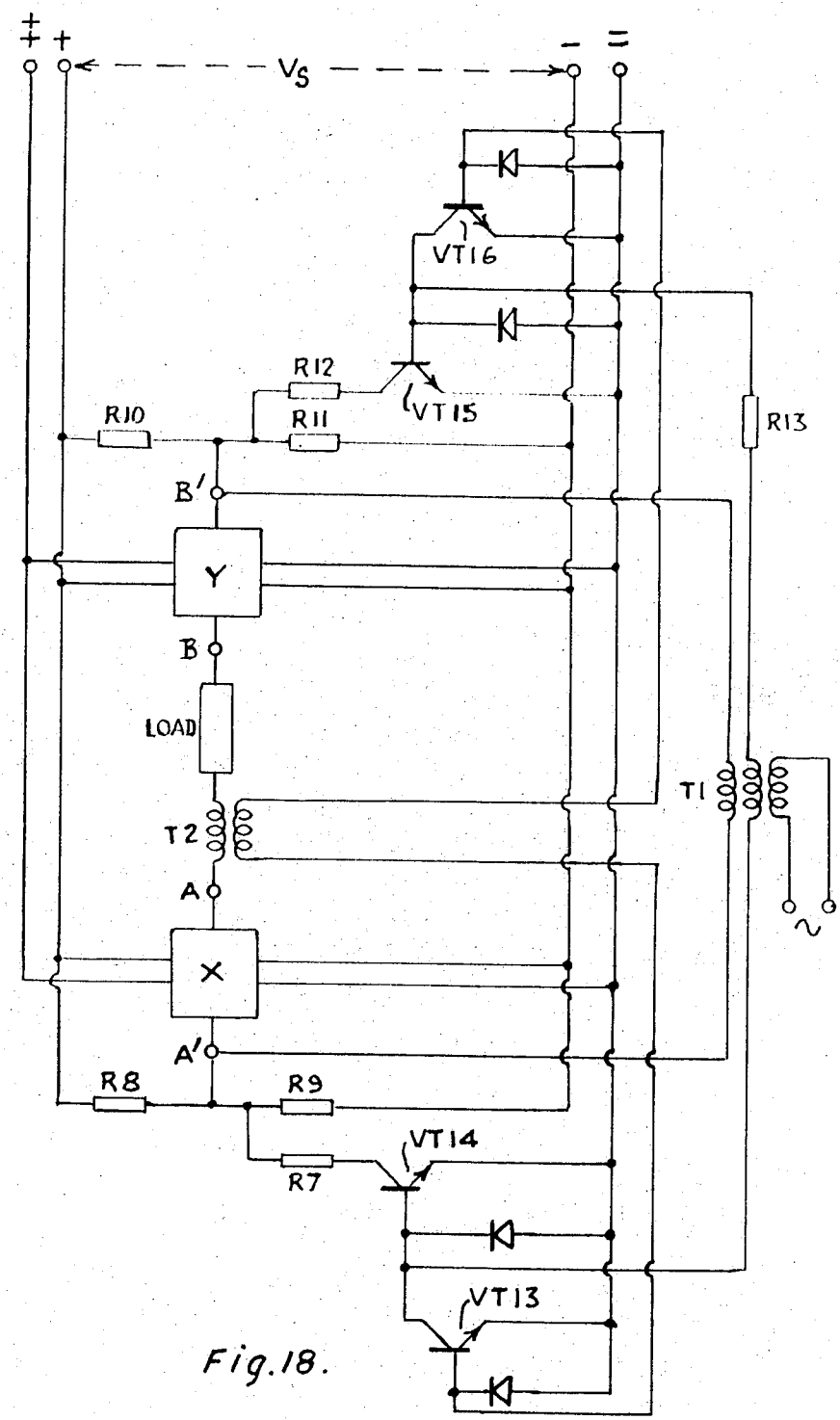

As transistors VT1 and VT3 in the above circuit control the output most of the losses take place in the transistors. This can lead to under utilization of the transistors. An embodiment in which the losses are more evenly distributed is shown in FIG. 18. Boxes X and Y represent the two sides of the bridge circuit of FIG. 17, terminals A, B, A' and B' having the same position as those in FIG. 17. However the secondary of T1 is left floating and a tertiary winding is provided on T1. The primary of a current transformer T2 is connected in series with the load between terminals A and B. The operation of this embodiment is as follows. When transistors VT14 and VT15 are non-conducting the potentials at terminals A' and B' are determined by the potential dividers formed by resistors R8, R9 and R10, R11 respectively. The tertiary winding of transformer T1 is so phased that it supplied input signals to turn transistors VT14 and VT15 on respectively when A' is driven positive with respect to B' and B' driven positive with respect to A'. This situation occurs during values of $\omega t$ of 0 to $\phi$ and $\pi$ to $(\pi + \phi)$ respectively. Accordingly during these periods no current flows from the source to the load and the reactive energy in the load is dissipated as in the previous embodiment. On the load current reversal at $\phi$ or $(\pi + \phi)$ transistors VT16 and VT13 respectively are turned on to remove the drive from transistors VT15 or VT14 which restores control of the potential at A' or B' to the respective potential dividers. Transistors VT2 and VT4 are therefore only saturated for part of each half cycle and for the remainder of each half cycle the control of load current is shared between the two transistors in the conducting state at that time. In this way the losses are more evenly distributed.

Figure 19:
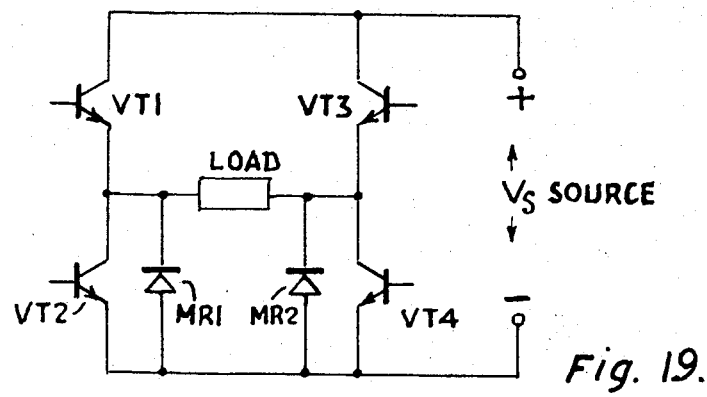
Figure 20:
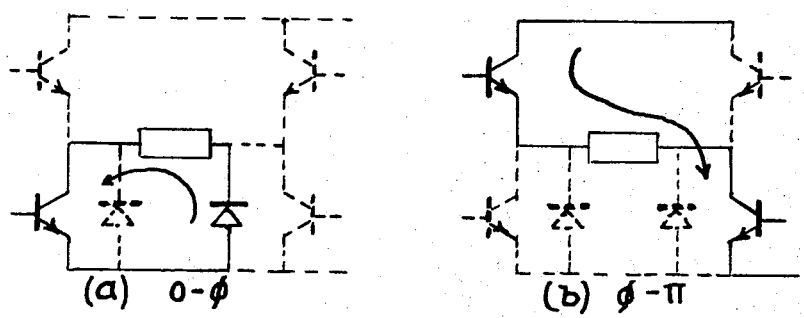
Figure 20:
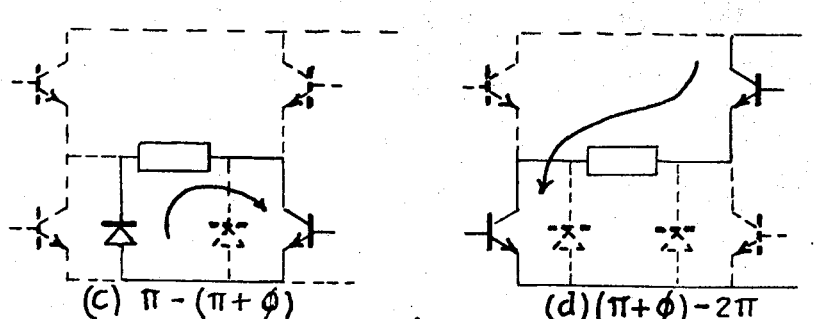

Thus each inverter may be of the form discussed above, i.e., an amplifier arranged to produce an a.c. output in accordance with a control signal. Two further figures from the U.K. application referred to above are repeated here for convenience as FIGS. 19 and 20. It will be seen in FIG. 19 that current flows diagonally of the bridge formed by devices VT1, VT2, VT3 and VT4, VT2 and VT4 acting as switches while VT1 and VT3 act as linear control elements. In the periods between displaced voltage and current zeroes (FIGS. 20a and 20c) current flows through one control element and a diode.

Figure 15:
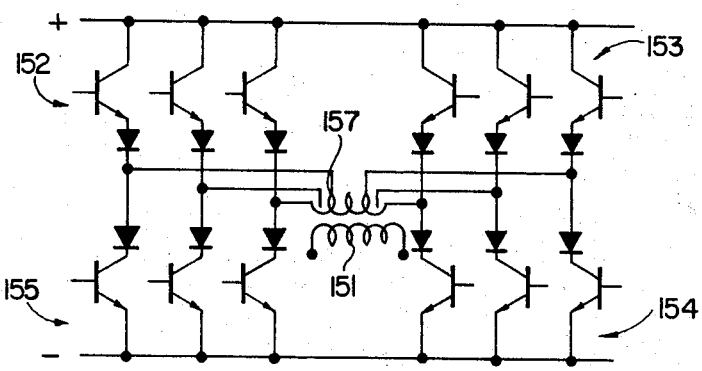
FIG. 15 shows how this inverter could be arranged to produce the effect of being supplied by a stepping-value voltage.
Figure 16:
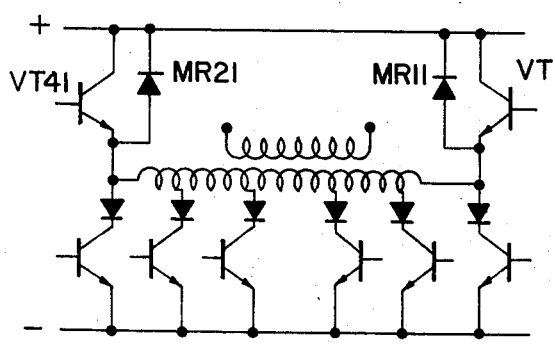

Referring now to FIG. 16 this shows a modification of the circuit of FIG. 15 referred to above, according to the teachings of the U.K. Patent Application referred to. This modification eliminates two groups of switching elements and provides in place of each a transistor, 161, 162 (and diodes 163, 164 if required) in accordance with the above-mentioned application. The transistors VT21 and VT41 and associated diodes MR11 and MR21 are equivalent to transistors VT2, VT4 and diodes MR1 and MR2 of FIG. 19. Although for the present invention it would be possible for the devices VT161 – 166 to act as the linear control elements it is simpler to confine these to a switching function and give the control function to devices VT41 and VT21, as is suggested for FIG. 17 described above.

As discussed above, FIG. 18 is a development of FIG. 17 in which the output current generates a control signal via transformer T2 which controls the times at which the additional winding on transformer T1 can cause the driver transistors VT14 and VT15 to drive the transistors VT2 and VT4 into saturation. FIG. 18 can be modified so that the diodes MR1 and MR2 can be placed across transistors VT1 and VT3 although this requires modifications of the bias arrangements.

Figure 21:
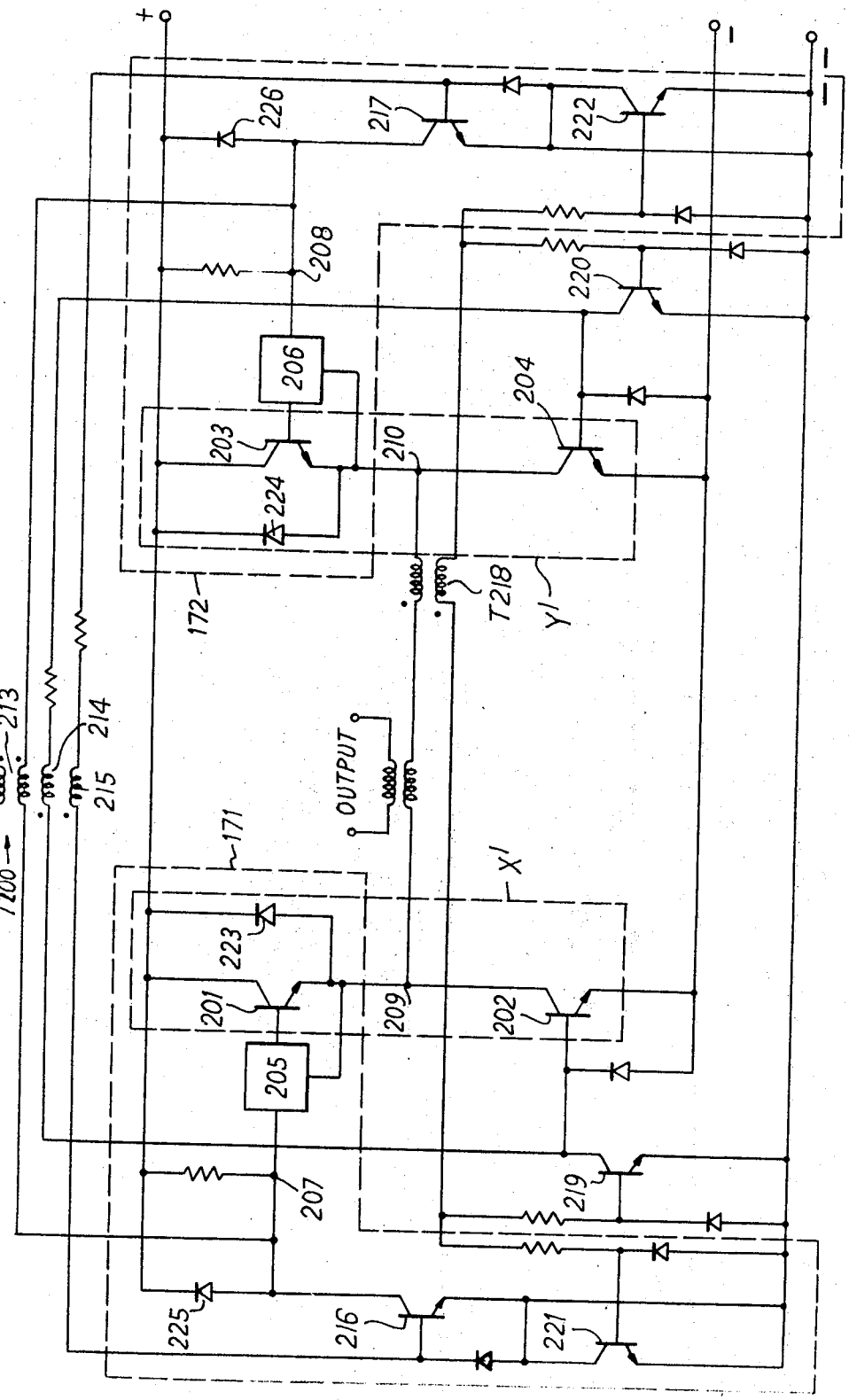

One form of such modifications is shown in FIG. 21, but in the embodiment of FIG. 21 the control of the main transistors VT1, 2, 3 and 4 of FIG. 17 is also made more independent by the removal of the control signal-splitting drive transistors VT5 to 12 inclusive and their replacement by separate bias circuits, together with the provision of another winding on the control signal transformer. The blocks indicated at X' and Y' in FIG. 21 are the thus-simplified form of blocks X, Y of FIG. 18. The bias circuits for transistors 202 and 204 are simple drive circuits formed by transistors 219 and 220 respectively. These operate in a similar manner to VT16 of FIG. 18, being controlled by a winding 214 of transformer T200 and the output current transformer T218.

The output current transformer signal is also applied to the bias circuits for transistors 201 and 203 with the associated diodes 223 and 224 equivalent to diodes MR1 and MR2 of FIG. 17. Transistors 222 and 221 respond to the output current waveform as explained above for VT16 of FIG. 18 to control the response of transistors 217 and 216 to the control signal on winding 215 of transformer T200.

Summarizing the operation of FIG. 21 it is seen that as in FIG. 18 a signal of the desired output waveform and amplitude is applied to the primary terminals 211 and 212 of transformer T200. A part, 213, of the secondary winding of transformer T200 applies the required output voltage between points 207 and 208. Blocks 205 and 206 represent conventional feedback-controlled amplifiers which adjust the base voltages of transistors 201 and 203 respectively so that points 209 and 210 are at the same potential as points 207 and 208 respectively. Two further parts, 214 and 215, of the secondary winding of transformer T200 also provide control signals for the circuit. Part 214 provides current for for the alternate switching-on of transistors 202 and 204. Part 215 similarly alternately switches-on transistors 216 and 217, 216 conducting with 202 to hold the potential of point 207 to approximately the main negative rail (−) by virtue of the more negative supply (——) on its emitter. Transistor 217 controls point 208 in a similar way, as appropriate. The output waveform is thus formed by two series of alternate similarly-poled half cycles on each of terminals 209 and 210, each terminal being held at the potential of the (−) rail in turn. When the load is reactive output current can flow in opposition to the voltage over part of a half cycle, e.g., from point 209 to point 210 when 210 is positive w.r.t. 209. Then current in transformer T218 turns on transistor T219 to remove the base drive from transistor T202 and from transistor 216 by turning on transistor 221. The potential of point 207 can now rise toward the positive rail (+) and the load current must now flow via diode 224 transistor 204 already being non-conductive. Diode 226 restricts the potential of point 208 (and 210) to just above the positive rail (+). Transistor 201 must now control the output voltage as it is the only active element in the conducting state. The rise of potential of point 209 is thus controlled to maintain the chosen voltage waveform between points 209 and 210.

Figure 22:
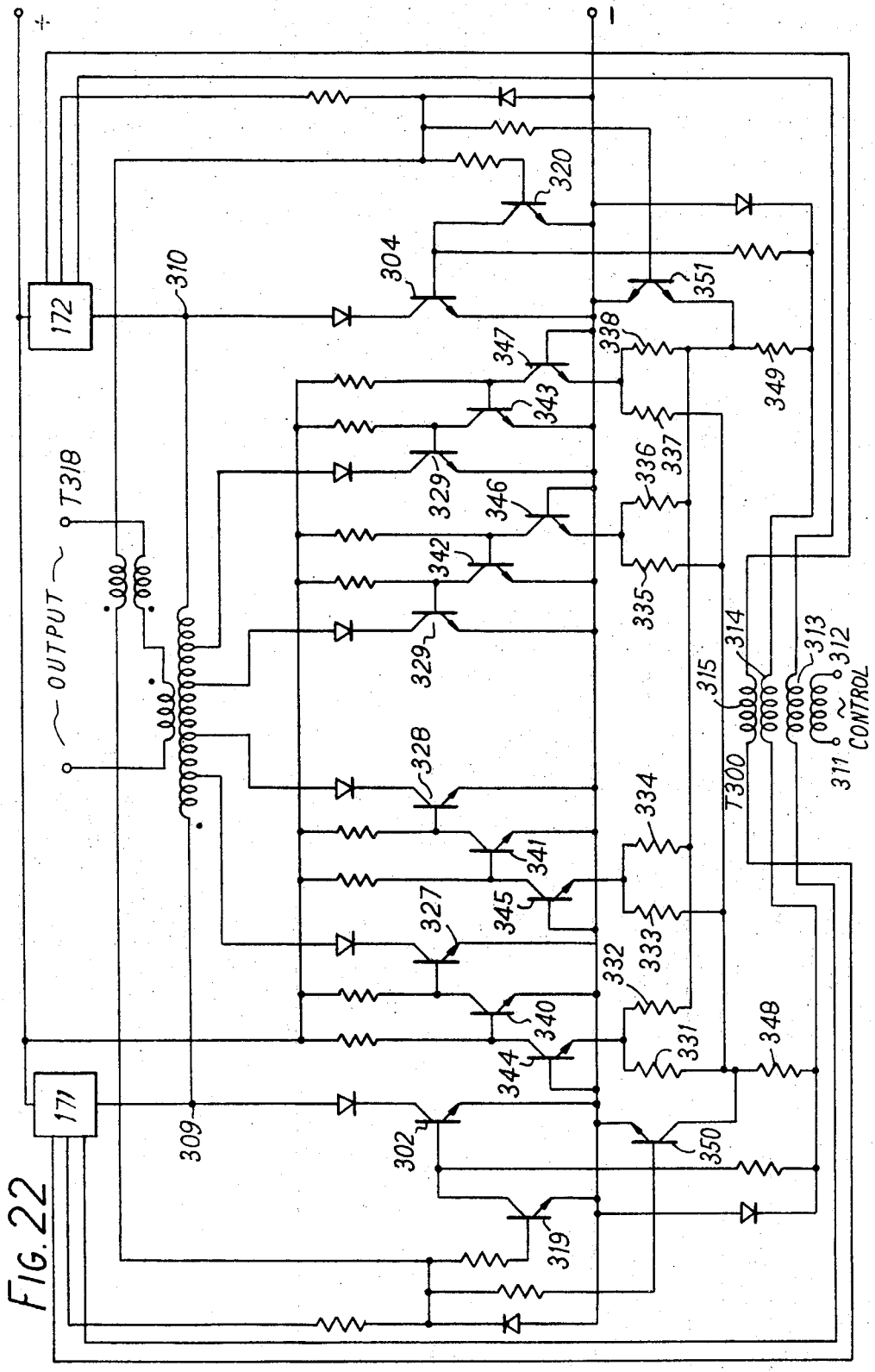

Referring now to FIG. 22 this shows FIG. 21 with the addition of tap-changing transistors as shown in FIG. 16, the parts enclosed in boxes 171 and 172 of FIG. 21 being omitted in FIG. 22 for clarity.

This arrangement permits the separation of the tap-changing and waveform-shaping functions and is therefore more easily understood. Thus to the two aspects described so far, of the diodes to improve reactive load performance and the Triplen drive waveform, is now added the tap-changing aspect of FIG. 16.

Figure 13:
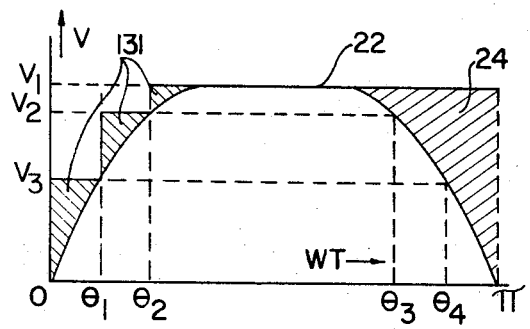
Figure 14:
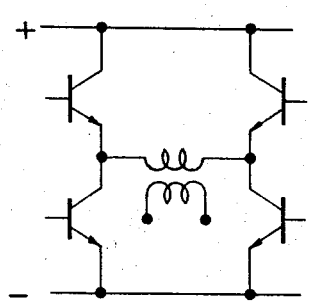
FIG. 14 shows a skeleton circuit of an inverter, which could be one of the inverters 1, 2 or 3 in FIG. 1, and generate a single-phase output.

In the illustrated embodiment the tap-changing instants are determined by reference to the value of the instantaneous input (or output) voltage as a proportion of the supply voltage. However the absolute value or other convenient reference could be used. It is desirable to attain the maximum output excursion permitted by the supply for each tap before changing to the next. Thus the potential at point 310 has a waveform formed of the three sections 131 of FIG. 13 drawn as if V1, V2 and V3 of FIG. 13 were equal (i.e., the supply voltage V1). In FIG. 22, components similar to those in FIG. 21 have been given the same reference numeral with prefix "3" instead of "2".

In operation of FIG. 22 the taps of output transformer T318 are selected by the rendering conductive of individual ones of transistors 302, 327, 328, 329, 330 and 304. The instant at which a transistor is switched is determined, in the illustrated embodiment, by the graded network of resistors 331–338. For example in the half cycle of output voltage in which point 309 is positive w.r.t. point 310 transistor 304 is first turned on by a current to its base from part-secondary 315 of transformer T300. Transistors 327–330 are all kept non-conductive by transistors 344–347 driven by currents from the positive supply rail (+), all proportional to the supply voltage.

Thus the emitter current of transistor 347, determined by the resistors 348 and 349, can, at an instantaneous value of output voltage which is a chosen proportion of the supply voltage, rise to the point where transistor 347 removes the base drive from transistor 343, transistor 330 will turn on and connect the first primary tap of transformer T318 to the negative rail (−). The point is chosen as that where transistor 201 (FIG. 20) is near to saturation. Next transistor 329 is turned-on in its turn by the current in the higher-valued resistor 336 acting on transistor 346. Transistors 328 and 332 follow in their turn. In the other polarity sense of terminals 309, 310 the reverse sequence of tap-selection is determined by resistors 331, 333, 335 and 337.

When the load is not such as to produce an output current flow in opposition to the output voltage the tap changing may proceed as described. However when the current is in opposition and one of diodes 223 or 224 of FIG. 21 is in use all of transistors 302, 304 and 327 − 330 must be turned off. Accordingly transistors 350 and 351 are provided which together with resistors 348 and 349 act to inhibit current through the appropriate ones of proportioning resistors 331 to 338 when the current and voltage are in opposition. In practice the stepping of the input voltage is less convenient than the method adopted below which achieves this effect. The primary of the inverter output transformer 151 has tappings corresponding to the output voltage for values $V_2$ and $V_1$ of the supply for the inverter and four groups of switching elements 152, 153, 154, 155, such as transistors, to connect the appropriate tapping of the transformer to the inverter at the appropriate instant in time, under the control of means not shown. As transformer 151 is the output transformer of the inverter when, in FIG. 13, $\omega t$ equals 0 the whole of the primary is used to produce the effect at the output terminals of the inverter being supplied with a voltage of value $V_3$. Then, when $\omega t$ equals $\theta_1$, the primary is tapped down by the operation of the switching elements to the intermediate point 157, corresponding to a supply voltage $V_2$, and again at $\omega t$ equals $\theta_2$ to the smallest section of the primary for the value $V_1$. Tapping down the primary in this way increases the transformer step-up ratio and has the effect, at the output, of an increase in supply voltage. Similarly the supply voltage is stepped, in effect, from $V_1$ down through $V_2$ to $V_3$, by switching the tappings at $\omega t$ equals $\theta_3$ and $\theta_4$ (not shown in FIG. 13). The diodes in the switching element groups of FIG. 15 protect the transistors against excessive reverse $V_{be}$.

Control circuits to time the switching of the elements of the groups, at e.g. $\theta_1$, $\theta_2$, etc., will be readily envisaged by those skilled in the art and are therefore not shown in the drawings or further described.

Figure 5:
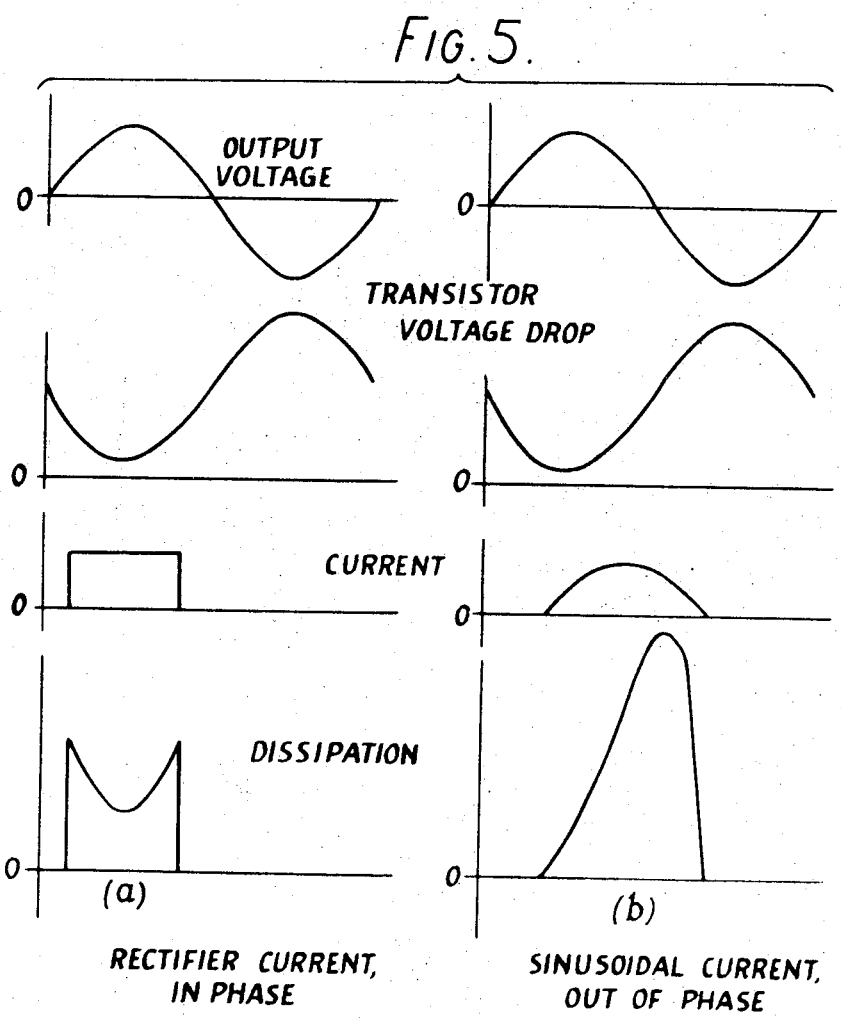
Figure 6:
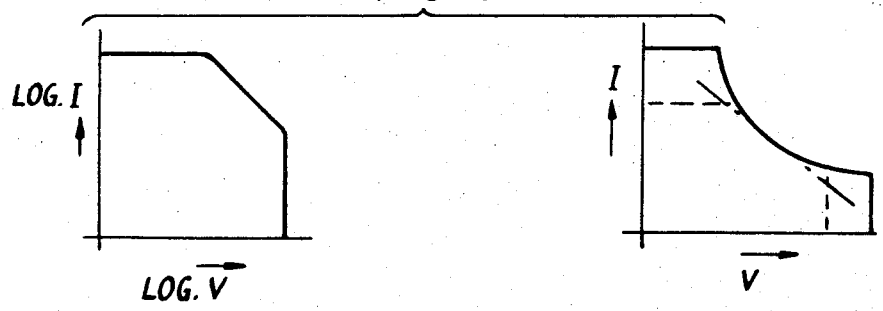
Figure 7:
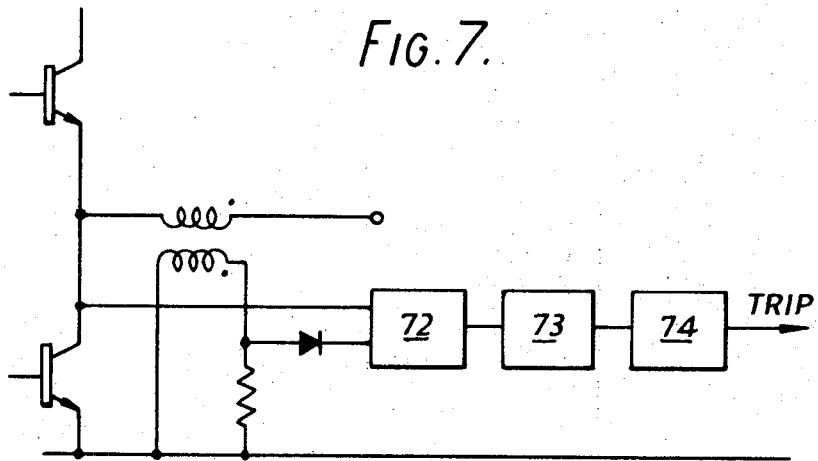
Figure 9:
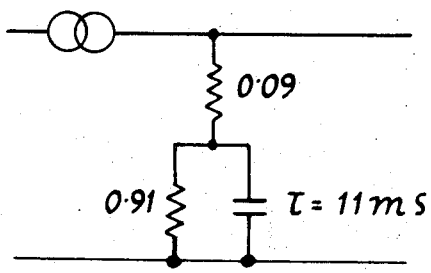
Figure 8:
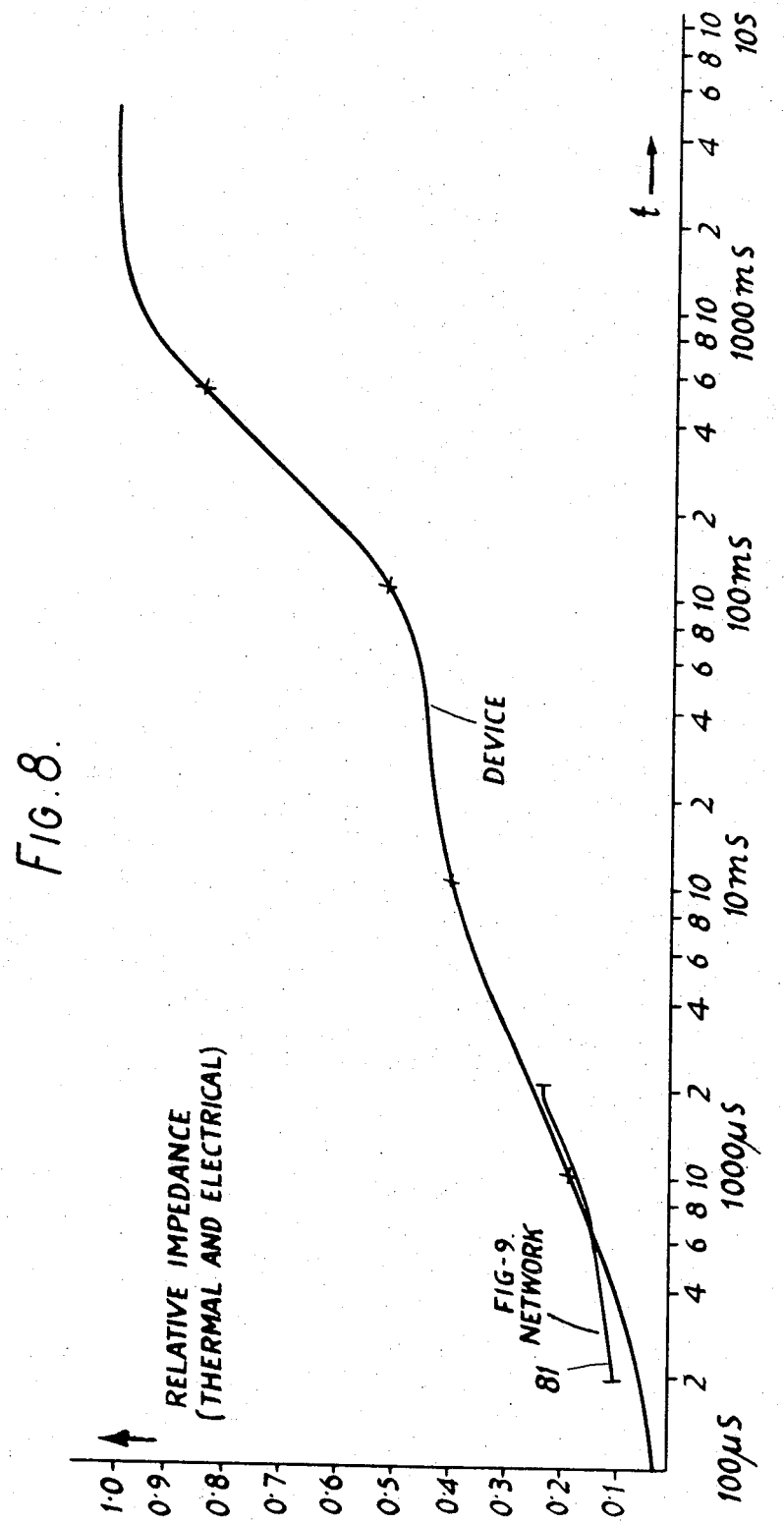
Figure 10:
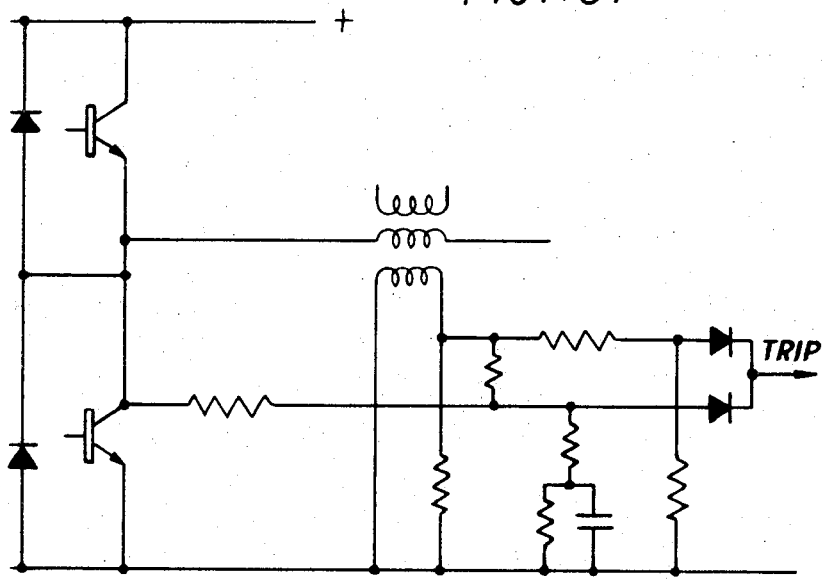
Figure 11:
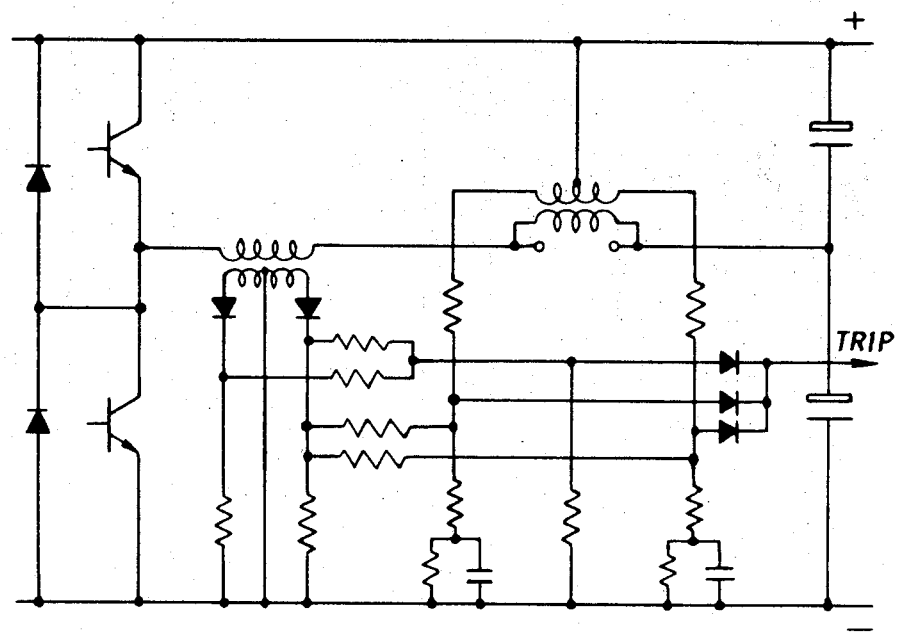
Figure 12:
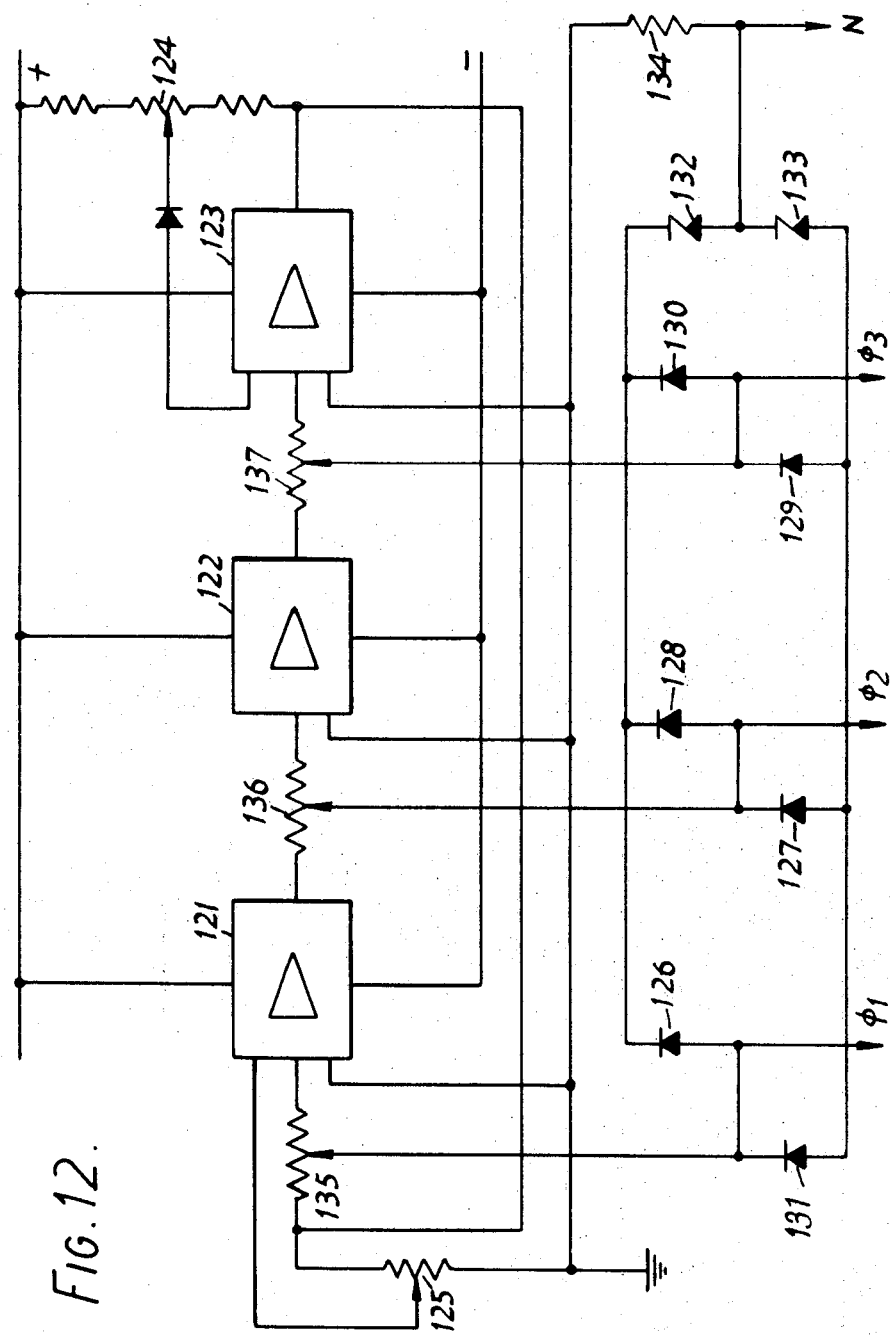

An important advantage of the use of the effects of a stepped-value supply will be appreciated on consideration of FIG. 5. With a reactive load high current does not coincide with minimum transistor volt drop (see FIG. 5b) as is the case for a resistive load. Therefore the dissipation of power in the transistor of the inverter increases, when compared with the resistive case, restricting the power transfer capacity of the inverter on reactive loads. By restricting the supply voltage when transistor volt drop would be high the dissipation in the device is reduced and the rated power transfer on resistive load is maintained for a wider range of reactive load values. In this way a smaller inverter can be used to supply a given reactive load and, furthermore, the power input required is reduced. Such a saving of power and inverter size is of considerable importance on vehicle borne equipment as it produces a saving in the weight of any generator and its associated prime mover as well as in any storage batteries and the inverter itself.

The circuit arrangement specifically described above may be modified in manners which will be readily apparent to those skilled in the art to achieve further saving of power or improved degree of protection and accuracy of waveform.

Having thus described our invention, what we claim is:

1. An inverter arrangement comprising inverter means including input terminals for connection to a d.c. source, and output terminals for supplying a three-phase, three-phase alternating current output, and a drive signal generator for generating a drive signal for said inverter means which includes the fundamental frequency of said alternating current output and $3^x$ harmonics thereof, where x is a positive integer; said inverter means including means responsive to said drive signal for amplifying said signal to the amplitude of the d.c. source so that each phase output waveform includes harmonic components which in conjunction with the harmonic components of the other phase voltages provide a sinusoidal line-to-line waveform of higher value than that formed by the fundamental of each phase voltage, said arrangement further comprising means for restricting the power dissipation in the inverter means during the transistion of the output voltage waveform from one extreme value to the other extreme value which adjusts the relative values of the supply voltage and output voltage of the inverter means during said transition.

2. An arrangement as claimed in claim 1 wherein said power dissipation restricting means adjusts said relative values in a step-wise manner.

3. An arrangement as claimed in claim 2 which said step-wise adjustment is performed by switching elements arranged to connect appropriate portions of an output transformer between the inverter and a load.

4. An arrangement as claimed in claim 2 which said adjustment is performed by connecting an appropriate lower one of a plurality of values of supply voltage to the inverter.

* * * * *